United States Patent [19]

Hoshino et al.

[11] Patent Number: 4,497,055
[45] Date of Patent: Jan. 29, 1985

[54] DATA ERROR CONCEALING METHOD AND APPARATUS

[75] Inventors: Takashi Hoshino, Fujisawa; Takao Arai, Yokohama, both of Japan

[73] Assignee: Hitachi, Ltd., Tokyo, Japan

[21] Appl. No.: 386,580

[22] Filed: Jun. 9, 1982

[30] Foreign Application Priority Data

Jun. 17, 1981 [JP] Japan .................................. 56-92309

[51] Int. Cl.³ .............................................. G06F 11/10
[52] U.S. Cl. ...................................... 371/31; 360/38.1
[58] Field of Search ........................ 371/31, 37, 39, 40; 360/38.1, 53; 358/314

[56] References Cited

U.S. PATENT DOCUMENTS

| 3,496,528 | 2/1970 | Brey | 371/31 X |
| 3,569,934 | 3/1971 | Parr, Jr. | 371/31 |
| 4,146,099 | 3/1979 | Matsushima et al. | 371/31 X |
| 4,188,616 | 2/1980 | Kazami et al. | 371/37 |
| 4,202,018 | 5/1980 | Stockham, Jr. | 360/53 X |
| 4,437,185 | 3/1984 | Sako et al. | 371/39 |

FOREIGN PATENT DOCUMENTS 2061665  5/1981  United Kingdom .................. 371/31

Primary Examiner—Charles E. Atkinson
Attorney, Agent, or Firm—Antonelli, Terry & Wands

[57] ABSTRACT

Errors in input data are concealed by interpolation using a mean value and the previous word which are automatically interchanged in accordance with the conditions of occurrence of errors. A series of data words in the input data is first modified into a form in which when the input word is erroneous it is replaced by correct input word immediately preceding the erroneous word. Then, in association with each word in the modified data word series a mean value between words immediately before and after that word or between that word and a word thereafter is produced, and if that word is the replaced word it is further replaced by the mean value produced in association with that data. Thus, an independent error is concealed by a mean value between the correct word immediately before and after the erroneous word while continuous errors are concealed in such a manner that the last erroneous word is replaced by the mean value between correct words occurring immediately before and after the continuous erroneous words and the other erroneous words are all replaced by the correct word occurring immediately before the continuous erroneous words.

7 Claims, 6 Drawing Figures

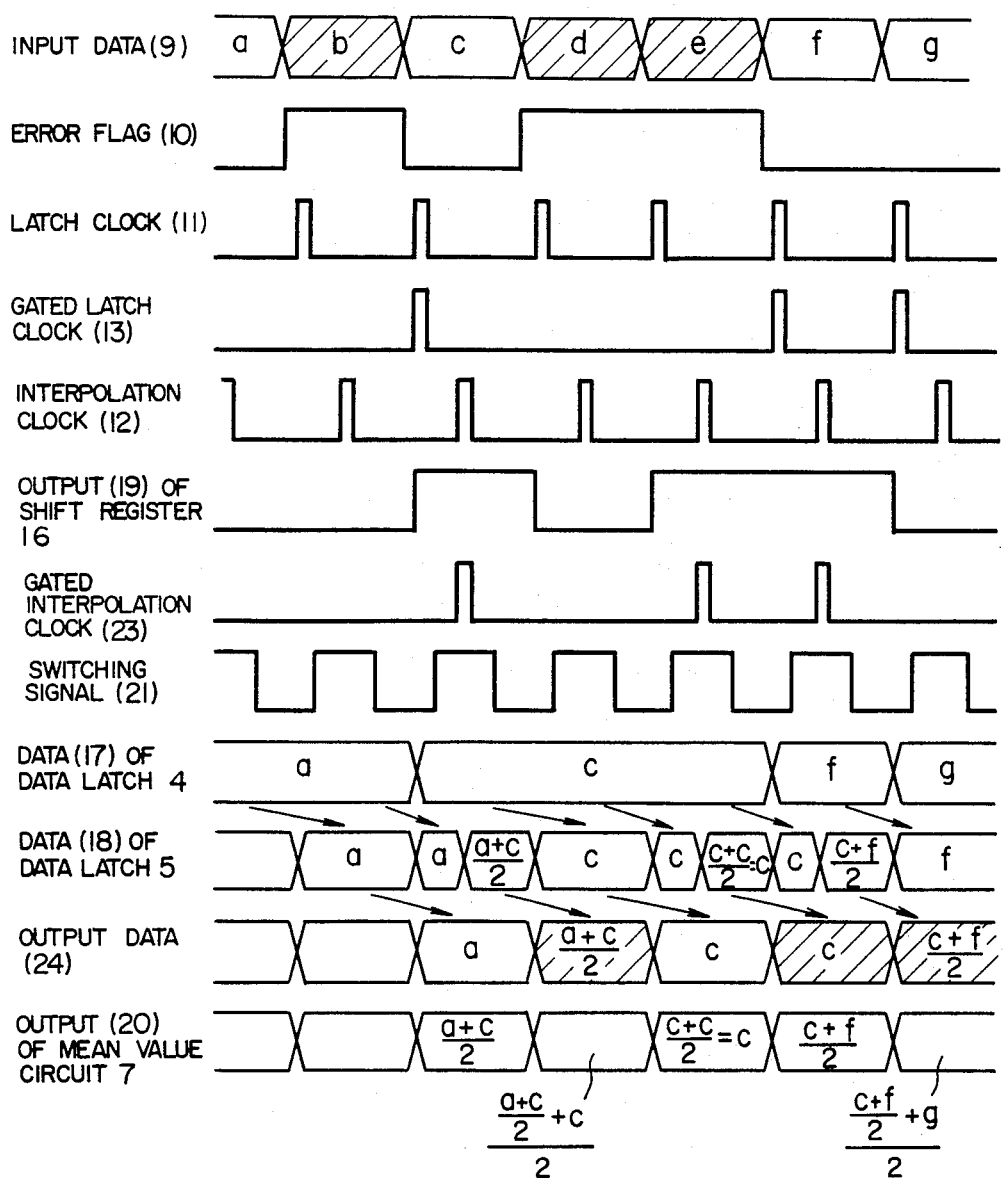

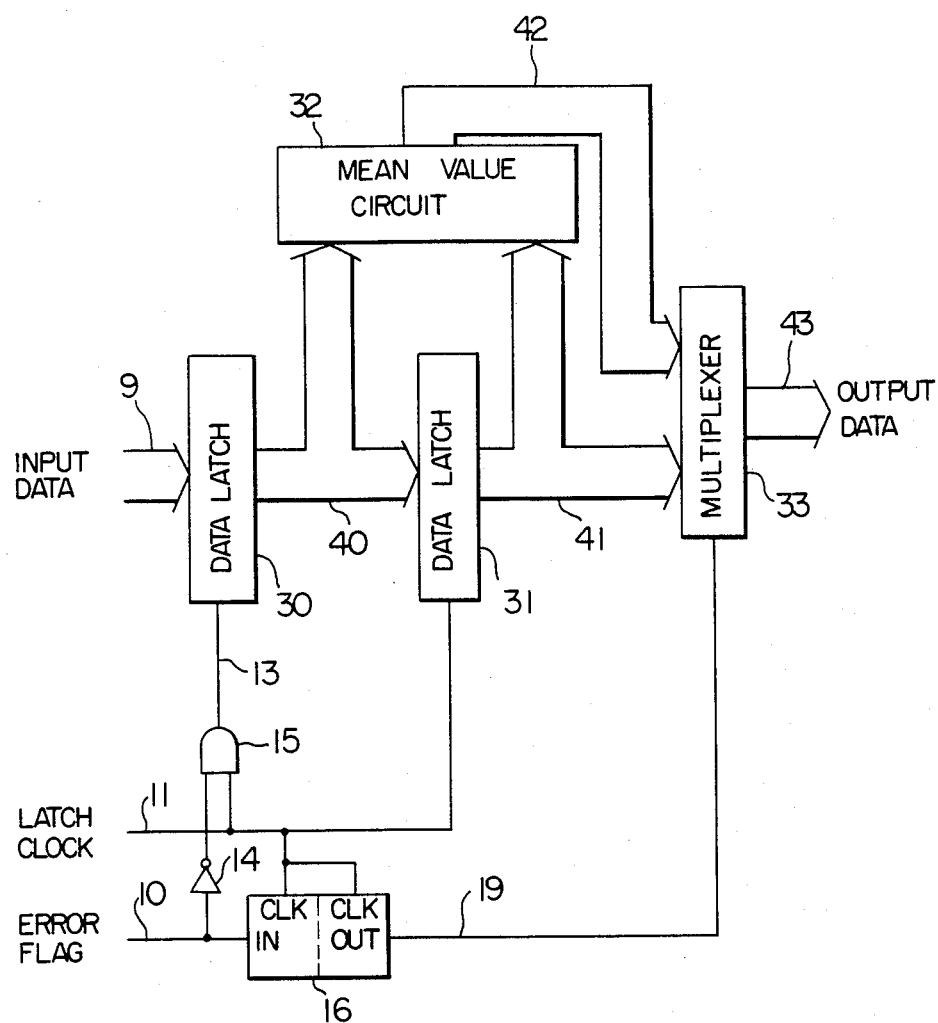

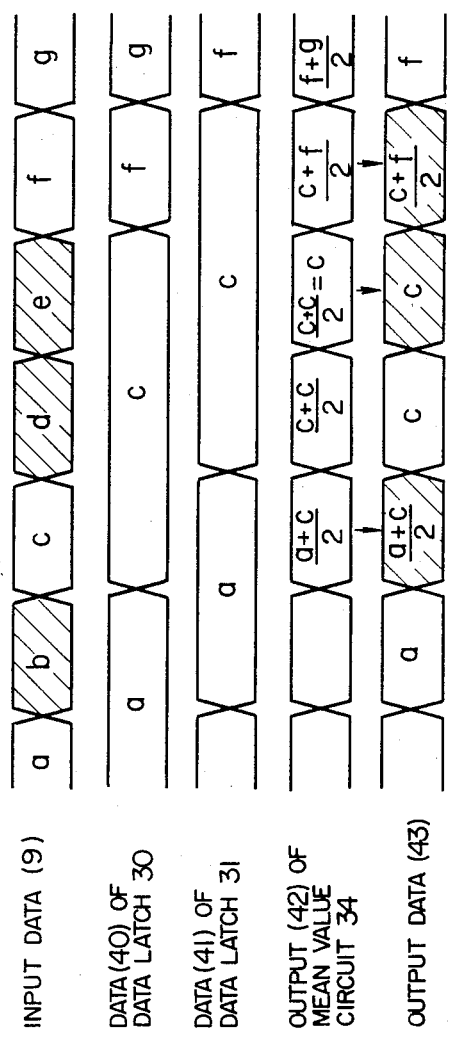

DATA ERROR CONCEALING METHOD AND APPARATUS

BACKGROUND OF THE INVENTION

The present invention relates to data error concealment in data processing systems. This invention is particularly advantageous for use in PCM (pulse code modulated) digital audio or audio/video reproducing systems.

A PCM technique, which is one of the signal processing techniques well known in the field of communication, has been recently used for recording/reproducing a video signal or audio signal. In particular, the PCM audio recording/reproducing technique, in which an audio signal is PCM recorded and then reproduced, has been rapidly developed to be put into practice as means for satisfying user's increased demands on the quality of sound. The development is based on the facts that the level of conventional analog recording techniques has been nearly saturated, the cost of A/D converters, D/A converters, IC memories or the like has been rapidly decreased, and code error correcting techniques have been improved.

In reproducing a PCM recorded audio signal, erroneous data, if any, is restored to correct data through a predetermined error correcting operation. But, the correction is impossible under some of various conditions of error occurrence. In that case, if erroneous data is left as it is, the data may appear as abnormal sounds. In order to avoid this, it is required to conceal the erroneous data.

Prior to explanation of error concealment, a brief description will now be made of PCM audio recording/reproducing. In a typical example of well known recording systems, an A/D converter converts analog audio signals of two channels L and R into PCM digital data signals of binary level "1" and "0" which contain 14 bits per unit data or word. Data blocks each composed of such six digitalized words are supplied to an error correcting word generator which uses six words in each data block to generate, through logical operations thereof, two 14-bit error correcting words P and Q for addition to that data block. For example, the first block is now constructed by an 8-word digital signal including $L_n$ (first data inputted from the L channel), $R_n$ (first data inputted from the R channel), $L_{n+1}$, $R_{n+1}$, $R_{n+2}$, $P_n$ and $Q_n$ in this order. Thereafter, in order to provide against the occurrence of continuous data errors due to dropouts, etc. in data reproduction from a recording medium, the consecutive data is scrambled or interleaved in an interleave memory in a predetermined manner. For example, the first block is now composed of $L_n$, $R_{n-3D}$, $L_{n+1-6D}$, $R_{n+1-9D}$, $L_{n+2-12D}$, $R_{n+2-15D}$, $P_{n-18D}$ and $Q_{n-21D}$ (D=16H, H: block unit). The thus interleaved 8-word digital signal is supplied to an error detecting word generator where a 16-bit error data detecting word called a cyclic redundancy check code (CRCC) used for identifying an error word in each block is generated and added to that block. The CRCC added digital signals including nine words per unit block are recorded in a recording medium. (When a video tape is used, those signals are recorded after the conversion thereof into a standard TV signal format.) In a reproducing system, reverse processing is carried out. Digital signals produced from the recording medium are supplied to an error detecting circuit where the error detecting word CRCC is used to check for data error and a error flag is set if a data error is detected. The data is then restored to its original sequential order by a de-interleave memory. The de-interleaved data is supplied to an error correcting circuit. If any data error is detected in the de-interleaved data according to the error flag, the error is corrected through logical operations using the error correcting words P and Q so that the erroneous data is restored to correct data. For error exceeding the ability of correction using P and Q, the error is detected using CRCC and concealed. In some cases, the error correction using P and Q is not made but only the error concealment using CRCC is carried out.

One conventional approach for concealing data error is a so-called previous word hold method in which erroneous data is replaced or interpolated by the previous correct data, as shown in FIG. 1. Referring to FIG. 1, reference numeral 1 represents a correct waveform to be reproduced while numeral 2 represents a previous word held waveform. As apparent from the comparison between the waveform 1 including data, A, B, C, D, E and F and the waveform 2 including data A, B', C, E' and F, a considerable difference exists therebetween. Thus, the previous word hold method provides a problem in the quality of reproduced sounds.

Another conventional error concealment technique is an averaging method in which erroneous data is replaced or interpolated by a mean value between correct data immediately preceding and immediately following the erroneous data, as shown in FIG. 2. As apparent from the comparison between FIGS. 1 and 2, the averaging method provides a more merely excellent error concealment than the previous word hold method. Namely, the interpolated waveform 3 of FIG. 2 including data A, B'', C, D, E'' and F is nearer to the correct waveform 1 (including data A, B, C, D, E and F) than the waveform 2 of FIG. 1.

However, the actual use of the linear interpolation method will require different operations between times when an independent error is present in input data and when continuous errors are present in the input data. For example, for concealment of an independent error, three memories will be provided for storing three successive data words, since it is only necessary to know the correct data words immediately preceding and immediately following the erroneous data. For concealment of continuous errors, on the other hand, more than three memories will be required corresponding to the number of the continuous errors. In addition, a complicated control circuit will be required. But, in spite of the requirements of the increased number of memories and the complicated control circuit, which results in an overall circuitry of large size, it will be apparent that the effect of error concealment is small, since each of the continuous erroneous words is merely replaced by a mean value between correct words immediately preceding and immediately following the continuous erroneous words.

SUMMARY OF THE INVENTION

An object of the present invention is to provide a data error concealing method and apparatus in which interpolation using a mean value and based on the previous word can be effected with a simple circuit configuration in accordance with the conditions of occurrence of errors.

According to the invention, a series of data words in the input data is modified into a form in which, when the input data word is erroneous, a correct data word immediately preceding the erroneous word is held instead of the erroneous word itself (previous word hold). Then, in association with each data word in the modified data word series, the mean value between words immediately preceding and immediately following that word or between that word and a data word immediately following that word is produced. If that word is originated from the erroneous input word, i.e. if it is a value resulting from the previous word hold for the erroneous input word, that word is replaced by the above-mentioned mean value produced in association with that word, thereby completing the error concealment. The cooperation of the previous word hold in the first step with the replacement by the mean value in the second step results in an error concealment in which, when an independent erroneous word is present in the input data, the erroneous word is replaced by a mean value between the correct input words immediately preceding and immediately following the erroneous word (interpolation using a mean value); while, when continuous erroneous words are present in the input data, the last erroneous word is replaced by a mean value between correct input words immediately preceding and immediately following the continuous erroneous words using a mean value and the other erroneous words are replaced by a correct input word immediately preceding the continuous erroneous word (previous word hold).

BRIEF DESCRIPTION OF THE DRAWINGS

FIG. 4 illustrates a timing chart for explaining the operation of the apparatus shown in FIG. 3;

FIG. 5 shows in block diagram a second embodiment of a data error concealing apparatus according to the invention; and FIG. 6 illustrates a timing chart for explaining the operation of the apparatus shown in FIG. 5.

DESCRIPTION OF THE PREFERRED EMBODIMENTS

Figure 1:
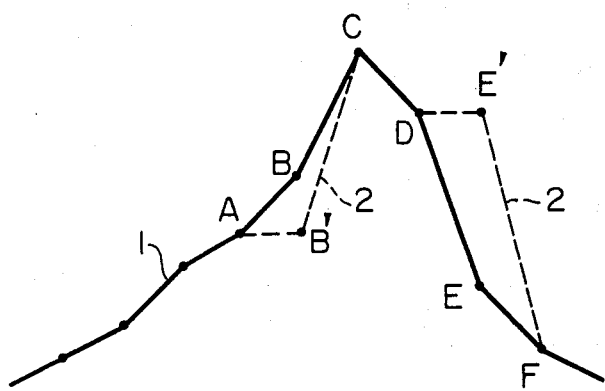
FIG. 1 is a view for explaining data error concealment according to the conventional previous word hold method.
Figure 2:
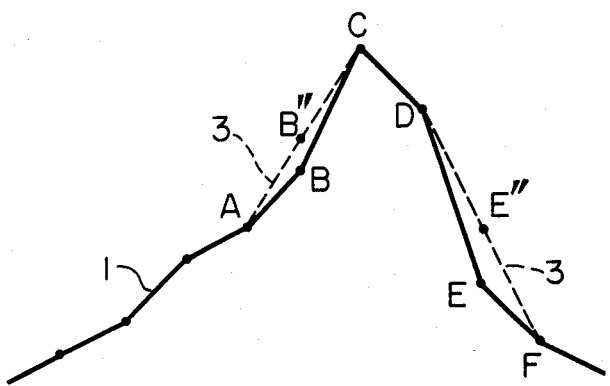
FIG. 2 is a view for explaining data error concealment according to the conventional linear method.
Figure 3:
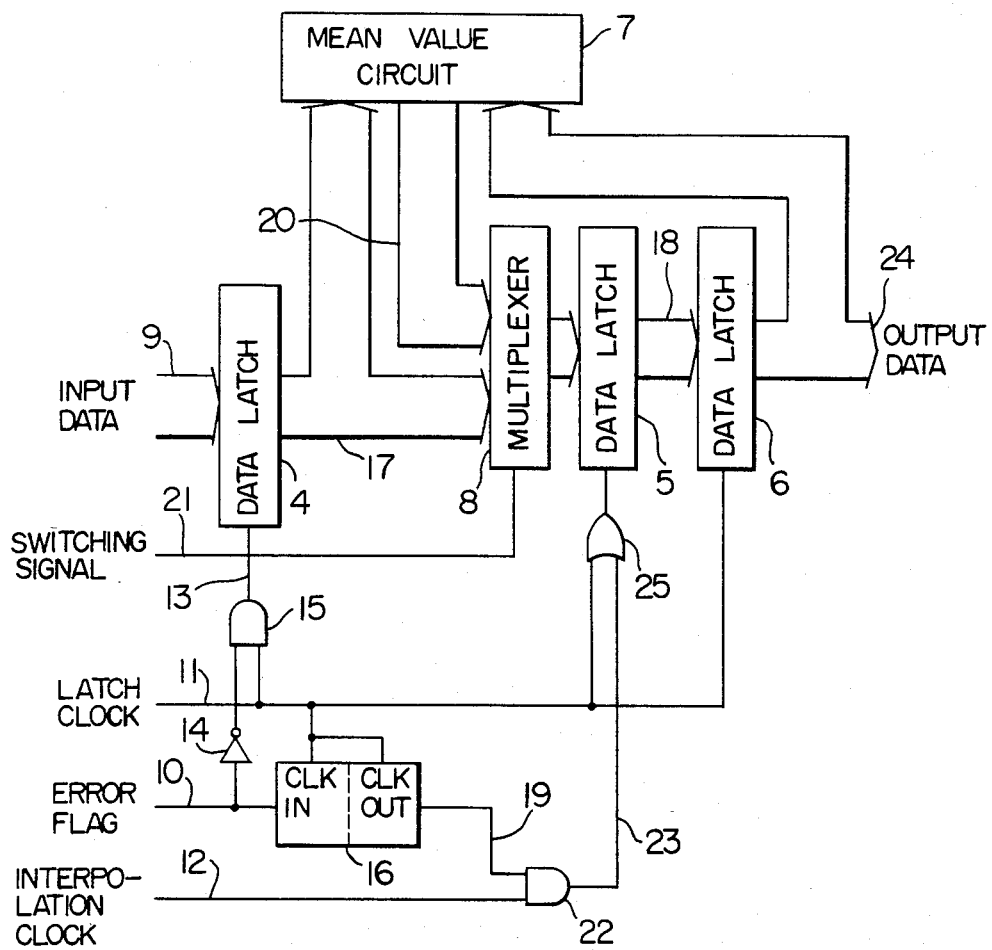
FIG. 3 shows in block diagram a first embodiment of a data error concealing apparatus according to the present invention.

FIG. 3 shows in block diagram a first embodiment of a data error concealing apparatus according to the present invention, and FIG. 4 illustrates a timing chart for explaining the operation of the apparatus shown in FIG. 3.

Referring to FIG. 3, reference numerals 4, 5 and 6 represents first, second and third data latch memories for storing data. Data is transferred through the data latches 4, 5 and 6 in this order. A mean value circuit 7 produces the mean value between the content of the first data latch 4 and the content of the third data latch 6. A multiplexer 8 is provided for changing over the data from the first data latch 4 and the output of the mean value circuit 7 for delivery to the second data latch 5 as data to be stored therein.

Numeral 9 represents input data on an input data bus. Numeral 10 is an error flag signal indicating whether or not an erroneous data word exists in the input data 9. The error flag signal is high level or true when the input data word is erroneous and low level or not true when the input data word is correct. For example, in PCM audio recording/reproducing, it is well known that an error detecting word (CRCC) generated in the recording process is used to check for error in the reproducing process so that an error flag is set to each data word.

Latch clocks 11 are used for latching the data latches 4, 5 and 6 while cuasing data transfer through the data latches. Interpolation clocks 12 are used for latching the data latch 5 so that the output 20 of the mean value circuit 7 is taken into the data latch 5 via multiplexer 8.

Actually, the data latch 4 is latched by gated latch clocks 13, i.e. the output of an AND gate 15 which receives the latch clocks 11 and an inverted version of the error flag signal 10 passed through an inverter 14. The data latch 5 is latched by the latch clocks 11 and gated interpolation clocks 23, i.e. the output of an OR gate 25 which receives the latch clocks 11 and the output (gated interpolation clocks 23) of an AND gate 22 connected to receive the interpolation clocks 12 and the output 19 of a 2-bit shift register 16.

The data latch 6 is connected to an output data bus for delivering error concealed output data 24 thereto.

Basically, the respective data words included in the input data 9 are latched or stored into the data latch 4 by the latch clocks 11 which are generated in synchronism with the respective data words. But, clocks for directly latching the data latch 4 are the gated latch clocks 13, that is, those ones of the latch clocks 11 which are gated through the AND gate 5 by the inverted version of the error flag signal 10 passed through the inverter 14. Therefore, when an erroneous data word is present in the input data 9, that is, when the error flag signal 10 is true, no gated latch clock 13 is delivered. In this case, the content of the data latch 4 does not change, so that the data latch 4 continues to hold the previous data word (i.e. a correct data word just before the erroneous data word). Namely, the data latch 4 performs the previous word hold for the erroneous data word.

The error flag signal 10 is also received into the 2-bit shift register 16 by the latch clock 11 so that the output 19 of the shift register 16 is a version of the error flag signal 10 delayed by one clock period of the latch clocks 11. Since data 17 of the data latch 4 is transferred into the data latch 5 through the multiplexer 8 by the next latch clock 11, the output 19 of the shift register 16 indicates whether the data word transferred into the data latch 5 is a correct data word or a value resulting from the previous word hold for the erroneous input data word.

As described earlier, the interpolation clocks 12 are used for latching the output 20 of the mean value circuit 7 into the data latch 5. The timing of each of the interpolation clocks 12 is set to be between the latch clocks 11. Accordingly, the operation in the mean value circuit 7 is carried out during a period from the delivery of the latch clock 11 to the delivery of the interpolation clock 12.

A switching signal 21 controls the multiplexer 8 so that it passes therethrough the data 17 of the data latch 4 at the timing of delivery of the latch clock 11 and the output 20 of the mean value circuit 7 at the timing of delivery of the interpolation clock 12.

It should be noted that the interpolation clocks 12 are passed through the AND gate 22 under the control of the above-mentioned output 19 of the shift register 16.

Therefore, the gated interpolation clocks 23 are provided only when the data in the data latch 5 is a value resulting from the previous word hold or is originated from the erroneous input data word, that is, only when the output 19 of the shift register 16 is true. As a result, the output 20 of the mean value circuit 7 is taken into the data latch 5 by the gated interpolation clock 23. Thus, the error concealed output data 24 is obtained.

The operation of the apparatus shown in FIG. 3 will now be further explained in conjunction of various conditions of occurrence of errors, referring to FIG. 4.

Consider an independent error, that is, the case where among successive data words a, b and c in the input data 9 the words a and c are correct and the word b is erroneous. In this case, the erroneous word b is not latched into the data latch 4 because of the absence of gated latch clock 13. Thereinstead, the data latch 4 holds the correct word a. Thereafter, the held value a corresponding to the position of the word b is transferred or latched into the data latch 5 by the latch clock 11, while the c is latched into the data latch 4 in response to the clock 13. Since the contents of the data latches 4 and 6 at this time are c and a, respectively, the mean value circuit 7 produces $(a+c)/2$. This mean value is latched into the data latch 5 by the gated interpolation clock 23 instead of the value a transferred from the data latch 4. This results in an error concealed output data 24 in which the independent erroneous input word b is replaced by the mean value $(a+c)/2$ between the correct input words a and c immediately preceding and immediately following the erroneous word b. Namely, the erroneous word b is concealed by the interpolation using the mean value.

Next consider continuous errors, that is, the case where two successive words d and e in the input data 9 are erroneous. In this case, neither of the erroneous words d and e are latched into the data latch 4 because of the absence of gated latch clocks 13, and thereinstead the data latch 4 holds the correct word c immediately preceding these words d and e. The held value c corresponding to the position of the word d is transferred or latched into the data latch 5 by the latch clock 11, while the latch 4 again retains the word c due to continued absence of the clock 13. Since the contents of the data latches 4 and 6 at this time are both c, the mean value circuit 7 produces $(c+c)/2=c$. Though this mean value c is latched into the data latch 5 by the gated interpolation clock 23, the content of the data latch 5 does not change since the value c has been transferred already from the latch 4 into the latch 5. This results in error concealment in which the erroneous input word d is replaced by the correct input word c immediately preceding the erroneous word d. Namely, the first erroneous word d is concealed by the interpolated word. The value c held in the data latch 4 corresponding to the position of the word e is transferred or latched into the data latch also by the latch clock 11. The transferred value c is replaced by a mean value $(c+f)/2$ produced by the mean value circuit 7 which receives the content f of the data latch 4 and the content c of the data latch 6. This results in error concealment in which the erroneous input word e is replaced by the correct input words c and f immediately preceding and immediately following the erroneous words d and e. Namely, the second erroneous word e is concealed by the interpolation using the mean value. The above operation does not depend upon the number of continuous erroneous words. It will be understood that the last one in the stream of continuous erroneous words is concealed by the interpolation using the mean value while the other erroneous words are all concealed by the interpolation with the previous word.

As explained above, with the use of only three data latch memories and without any complicated special control circuit, error concealment including interpolation using the mean value and interpolation with the previous word which are automatically interchanged in accordance with the conditions of occurrence of errors, can be made in such a manner that, for an independent error the erroneous word is concealed by the interpolation using the mean value, while for continuous errors, the last erroneous word is concealed by the interpolation with mean value and the other erroneous words are concealed by the interpolation with the previous word.

In the above embodiment, the error concealment has been made so that the previous word held value in the data word series from the first data latch is replaced by the mean value between the data words immediately preceding and immediately following the previous word held value. However, it will be understood that the same result of error concealment can be obtained by using a mean value between the previous word held value and the data word just thereafter since the first data latch performs the function of previous word hold. An embodiment of a data error concealing apparatus for carrying out this is shown in FIG. 5 and a timing chart concerning the operation of the apparatus is illustrated in FIG. 6. In FIG. 5, the same reference numerals as those in FIG. 3 represent the same components or signals. Therefore, ERROR FLAG (10), LATCH CLOCK (11), GATED LATCH CLOCK (13) and OUTPUT (19) OF SHIFT REGISTER 16 hold for FIG. 6.

Referring to FIG. 5, data is transferred through first and second data latch memories 30 and 31. The data latch 30 performs the same function as the data latch 4 shown in FIG. 3. The data latch 31 is latched by latch clocks 11. A mean value circuit 32 produces a mean value 42 between the contents 40 and 41 of the first and second data latches 30 and 31. A multiplexer 33 changes over the content of the second data latch 31 and the output of the mean value circuit 32 for delivering error concealed output data 43 to an output data bus. The multiplexer 33 is controlled by the output 19 of the shift register 16 (i.e. a version of the error flag signal 10 delayed by one clock period of the latch clocks 11) so that the output of the mean value circuit 32 is passed therethrough when the output 19 is true. Though the output 19 for controlling the multiplexer 33 is shown to raise up at the same timing as the latch clock 11 in FIG. 4, it is preferable in operation to provide suitable delay means between the shift register 16 and the multiplexer 33 so that a signal slightly delayed with respect to the latch clock 11 is used to control the multiplexer 33.

As can be seen from the comparison of FIG. 6 with FIG. 4, only $(a+c)/2$, $(c+c)/2=c$ and $(c+f)/2$ among the output 42 of the mean value circuit 34 and among the output 20 of the mean value circuit 7 take the place of the erroneous words. Accordingly, it is evident that the apparatus shown in FIG. 5 using two data latch memories provides the same result of error concealment as the apparatus shown in FIG. 3.

As apparent from the foregoing, according to the present invention, error concealment including the interpolation using a mean value and the interpolation with the previous word which are automatically interchanged in accordance with the conditions of occurrence of various errors, can be effected with the use of less data latch memories and without any complicated special control circuit.

The present invention is advantageous for use in error concealment in digital audio or audio/video reproducing systems. The invention is useful in the case where error concealment follows error correction as well as the case where only error concealment is made without carrying out error correction.

So long as an error flag for indicating the presence/absence of error in each data word of the input data can be properly provided, the present invention is applicable to data error concealment in any data processing system.

We claim:

1. A data error concealing method comprising:
    a first step of successively receiving and storing data words in input data so that, when a received data word is erroneous, the correct input data word immediately preceding the erroneous word is held in storage as a replacement word instead of the erroneous word; and
    a second step in which, in association with each of the data words processed in said first step, a mean value between data words immediately preceding and immediately following that data word is produced, and in which, when the stored data word is a replacement word for an erroneous word, the replacement word is replaced by the mean value produced in association with the data word;
    whereby the holding in storage of the replacement word in said first step and the replacement of the replacement word by the mean value in said second step allow error concealment in which, when an independent erroneous word is present in the input data, the erroneous word is replaced by a mean value between correct input words immediately preceding and immediately following the erroneous word, while when a continuous series of erroneous words are present in the input data, the last erroneous word in the series is replaced by the mean value between the correct input words immediately preceding and immediately following the series of continuous erroneous words and the other erroneous words of the series are replaced by the correct input words immediately preceding the continuous series of erroneous words.

2. A data error concealing method comprising:
    a first step of successively receiving and storing data words in input data so that, when a received data word is erroneous, the correct input data word immediately preceding the erroneous word is held in storage as a replacement word instead of the erroneous word; and
    a second step in which, in association with each of the data words processed in said first step a mean value between that data word or its replacement word as held in storage and the data word immediately following that data word is produced, and in which, when the stored data word is a replacement word for an erroneous word, the replacement word is replaced by the mean value produced in association with the data word;
    whereby the holding storage of the replacement word in said first step and the replacement of the replacement word by the mean value in said second step allow error concealment in which, when an independent erroneous word is present in the input data, the erroneous word is replaced by a mean value between correct input words immediately preceding and immediately following the erroneous word, while when a continuous series of erroneous words are present in the input data, the last erroneous word in the series is replaced by a mean value between correct input words immediately preceding and immediately following the series of continuous erroneous words and the other erroneous words of the series are replaced by the correct input word immediately preceding the continuous series of erroneous words.

3. A data error concealing apparatus comprising:
    a first data latch memory connected to an input data bus for receiving and storing successive input data words applied thereto from said input data bus;
    first means for supplying latch clock signals;
    second means for applying said latch clock signals from said first means to said first data latch memory for latching of the same only when the input data word applied to said first data latch memory is correct, so that, when the input data word applied to said first data latch memory is erroneous, the correct input data word immediately preceding the erroneous word is held in storage as a replacement word in place of the erroneous word;
    second means for generating interpolation clock signals in correspondence with erroneous data words;
    a second data latch memory for receiving the content of said first memory;
    third means for applying to said second data latch memory for latching of the same said latch clock signals from said first means and also for applying said interpolation clock signals from said second means to said second data latch memory between said latch clock signals only when the word being supplied from said first data latch memory to said second data latch memory is a replacement word held in place of an erroneous input data word in said first data latch memory;
    a third data latch memory for receiving the content of said second data latch memory, said third data latch memory being connected to an output data bus for delivering error concealed output data thereto, said third data latch memory being latched by said latch clock signals from said first means;
    a mean value circuit for receiving the contents of said first and third data latch memories for producing a mean value therebetween;
    a multiplexer connected between said first and second data latch memories and to an output of said mean value circuit; and
    fourth means for applying to said multiplexer a switching signal which allows the passing of the content of said first data latch memory to said second data latch memory through said multiplexer at the timing of delivery of said latch clock signals from said first means and the passing of the mean value from said mean value circuit to said second data latch memory through said multiplexer at the timing of delivery of said interpolation clock signals from said third means.

4. A data error concealing apparatus according to claim 3, wherein said apparatus further comprises
    fifth means for supplying an error flag signal which is true when the input data word is erroneous and not true when it is correct;

said second means including a first AND date for receiving an inverted version of said error flag signal from said fifth means and said latch clock signals from said first means to provide gated latch clock signals only when said error flag signal is not true;

said third means including a delay circuit for delaying said error flag signal by one clock period of said latch clock signal of said first means, means for supplying interpolation clock signals, each of which is present between said latch clock signals from said first means, a second AND gate for receiving the delayed error flag signal from said sixth means and said interpolation clock signal to provide gate interpolation clock signals only when said delayed error flag signal is true, and an OR gate for receiving said latch clock signal from said first means and said gated interpolation clock signal from said second AND date.

5. A data error concealing apparatus comprises:

a first data latch memory connected to an input data bus for receiving and storing successive input data words applied thereto from said input data bus;

first means for supplying latch clock signals;

second means for applying said latch clock signals from said first means to said first data latch memory for latching of the same only when the input data word applied to said first data latch memory is correct, so that, when the input data word applied to said first data latch memory is erroneous, the correct input data word immediately preceding the erroneous word is held in storage as a replacement word in place of the erroneous word;

a second data latch memory for receiving the content of said first data latch memory, said second data latch memory being latched by said latch clock signals from said first means;

a mean value circuit for receiving the content of said first and second data latch memories for producing a mean value therebetween;

a multiplexer connected to receive the content of said second memory and the mean value from said mean value circuit multiplexer being connected to an output data bus for delivering error concealed output data thereto; and third means for supplying said multiplexer a control signal which allows the passing of the mean value from said mean value circuit through said multiplexer only when the content of said second data latch memory is the replacement word for the erroneous input data word in said first data latch memory.

6. A data error concealing apparatus according to claim 5, wherein said apparatus further comprises:

fourth means for supplying an error flag signal which is true when the input data word is erroneous and not true when it is correct;

said second means inluding a first AND date for receiving an inverted version of said error flag signal from said fourth means and said latch clock signal from said first means to provide gated latch clock signals only when said error flag signal is not true; and said third means includes a delay circuit for delaying said error flag signal by one clock period of said latch clock signal of said first means, said multiplexer being controlled by the delayed error flag signal as said control signal from said delay circuit.

7. A data error concealing apparatus according to claim 4 or 6, wherein said fourth means includes a 2-bit shift register connected to receive said error flag signal and said latch clock signal from said first means.

* * * * *